United States Patent [19]

Yamamoto et al.

[11] 4,355,338
[45] Oct. 19, 1982

[54] DUPLICATOR

[75] Inventors: Tatuo Yamamoto; Yoshio Taguchi; Atsushi Miyashita; Shigeo Todoroki; Susumu Katayama, all of Mitaka; Menoru Eeda, Kawasaki, all of Japan

[73] Assignee: Nippon Columbia K.K., Tokyo, Japan

[21] Appl. No.: 120,676

[22] Filed: Feb. 11, 1980

[30] Foreign Application Priority Data

| Feb. 13, 1979 | [JP] | Japan | 54-15275 |
| Feb. 13, 1979 | [JP] | Japan | 54-15276 |
| Feb. 13, 1979 | [JP] | Japan | 54-15277 |
| Feb. 13, 1979 | [JP] | Japan | 54-15278 |

[51] Int. Cl.$^3$ ............................................. G11B 5/86
[52] U.S. Cl. .................................................. 360/15
[58] Field of Search .......................................... 360/15

[56] References Cited

U.S. PATENT DOCUMENTS 4,229,770 10/1980 Ito ........................................ 360/15

Primary Examiner—Robert S. Tupper
Attorney, Agent, or Firm—McAulay, Fields, Fisher, Goldstein & Nissen

[57] ABSTRACT

A duplicator in which analog signals recorded on a master or like source tape are transferred to digital discs after conversion into digital form and the digital signals thus recorded on the digital discs are then transferred to slave tapes after reconversion into analog form.

5 Claims, 12 Drawing Figures

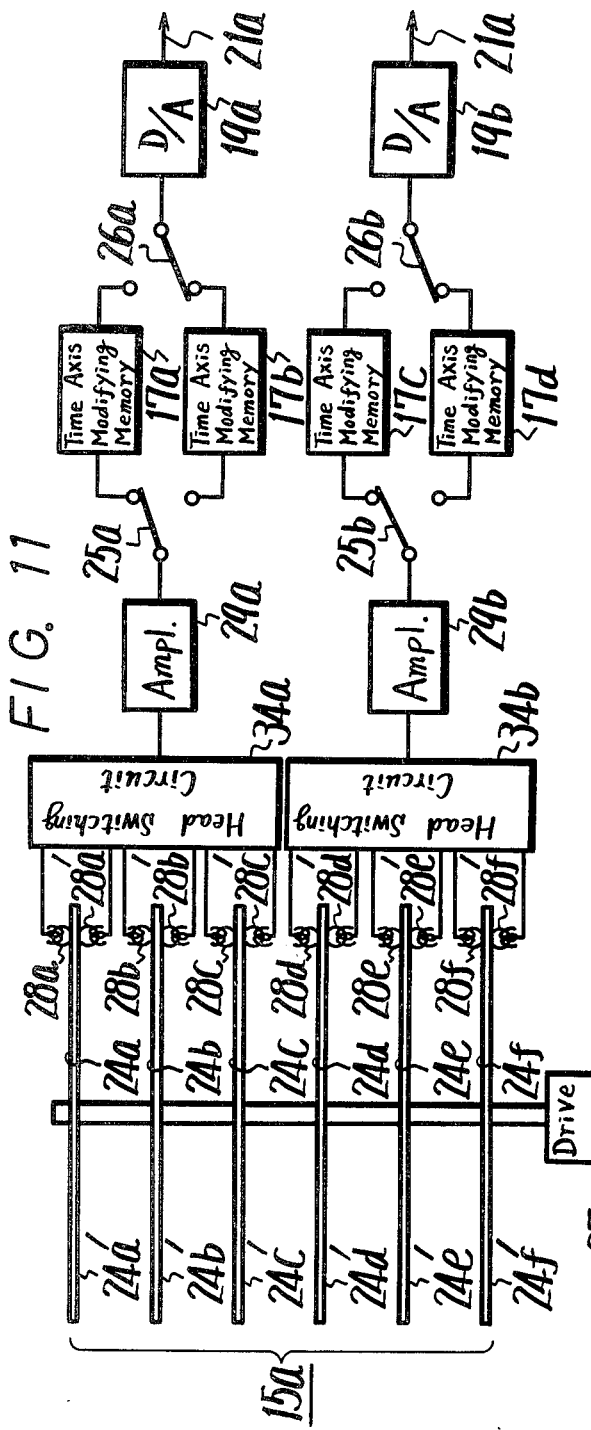
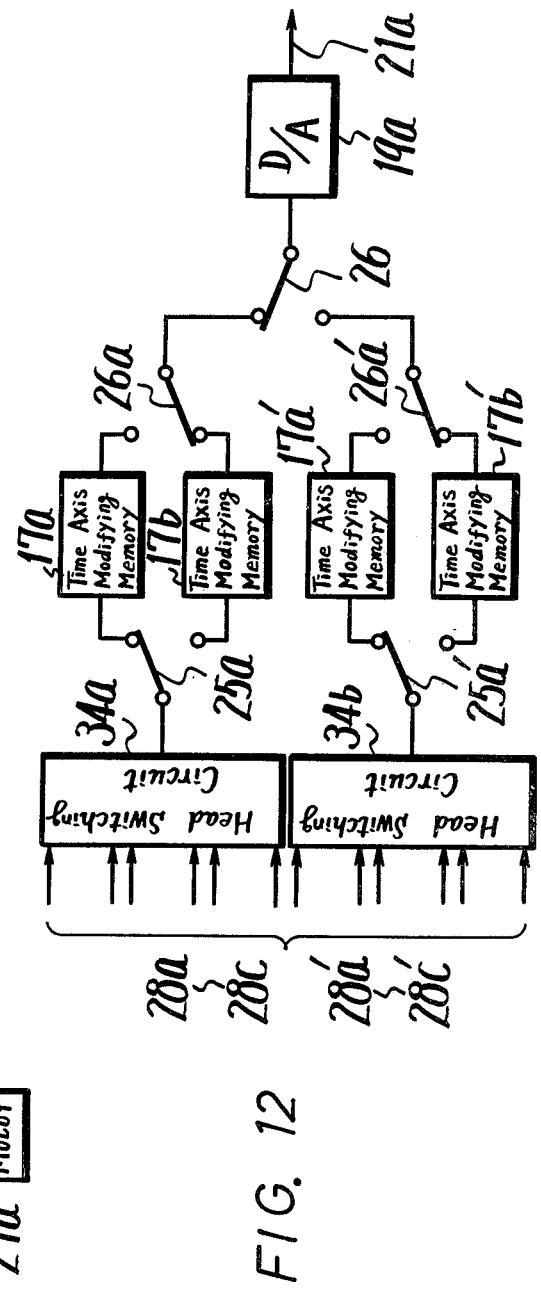
FIG. 11
FIG. 12

DUPLICATOR

BACKGROUND OF THE INVENTION

1. Field of the Invention

This invention relates to a duplicator, and more particularly to an apparatus and a system for transferring audio signals from a master or like source tape to slave tapes through utilization of discs adapted for time axis compressed recording.

2. Description of the Prior Art

For mass production of, for example, music or language prerecorded magnetic tapes, use has heretofore been made of a high-speed recording apparatus for dubbing which is commonly referred to as a duplicator. The conventional duplicator comprises a reproducing device for a master or like source tape and recording devices for slave tapes. As shown in FIG. 1, in a source tape reproducing device 1 a source tape 2 such, for example, as a print mother tape installed between supply and take-up reels 3 and 4 is driven at high speed to reproduce signals prerecorded on the source tape 2. The signals thus reproduced are supplied to a plurality of slave tape recording devices 5a, 5b, ... 5n, in which a plurality of unrecorded tapes 8a, 8b, ... 8n respectively stretched between supply and take-up reels 6a, 6b, ... 6n and 7a, 7b, ... 7n are also driven at high speed to record the abovesaid reproduced output signals. In this way, slave tapes of the same content as the source tape are mass produced simultaneously in a short time.

Generally, the abovesaid slave tapes are produced in the following manner: Mother tapes are first prepared by copying from a master tape and are each used for producing a number of print mother tapes, each of which is, in turn, used for fabricating slave tapes by means of a duplicator. The source tape mentioned herein includes all of the master tape, the mother tape and the printed mother tape. For example, in the case of mass producing music prerecorded tapes for cassette use by the employment of the abovesaid duplicator, if ordinary tapes are designed for a travelling speed of 19 cm/S, then the source tape reproducing device 1 reproduces the source tape at a driving speed of 19 cm×32 times=6 m/S and supplies reproduced output signals to the slave tape recording devices. The tape translation speed of the cassette tape is 4.8 cm/S, so that in the slave tape recording devices 5a, 5b, ... 5n the tapes are driven at a speed of 4.8 cm/S×32 =1.5 m/S for recording thereon the signals supplied from the source tape reproducing device 1. Thus, slave tapes having recorded thereon the same contents as the source tape are obtained at a speed equal to 1/32 of an ordinary tape speed.

With such a duplicator as described above, however, the quality of the slave tapes which are ultimately obtained depends on the quality of signals played back from the source tape. The source tape, in particular, the print mother tape is driven at high speed and used a number of times, so that it may often be damaged or broken to degrade its recorded contents, resulting in deterioration of the quality of the slave tapes; therefore, it is necessary to keep a reserve of such expensive print mother tape.

OBJECTS AND SUMMARY OF THE INVENTION

Accordingly, a primary object of this invention is to provide a duplicator and a duplicating method which are free from the abovesaid defect of the prior art and according to which analog signals recorded on a source tape are transferred to digital discs after conversion into digital form and the digital signals are then transferred to slave tapes after reconversion into analog form.

Another object of this invention is to provide a duplicator in which digital discs, each having recorded thereon digital signals on a time axis compressed basis, are driven in parallel to provide for increased signal transfer rate.

Still another object of this invention is to provide a duplicator which employs a plurality of magnetic head groups for each magnetic disc having recorded thereon signals on a time axis compressed basis to provide for increased signal transfer rate.

Yet another object of this invention is to provide a duplicator in which digital discs, each having recorded thereon digital signals on a time axis compressed basis, are operated in parallel to raise the signal transfer rate and driven synchronously so that they would not step out of synchronization during parallel operation.

Briefly stated, in the present invention, signals recorded on a source tape are reproduced by a source tape reproducing device for PCM recording on magnetic or optical discs on the time axis compressed basis, and then the time axis compressed signals thus recorded on the discs are reproduced as they are by disc reproducing devices for recording on slave tapes, thereby to reduce the overall time for the fabrication of slave tapes.

BRIEF DESCRIPTION OF THE DRAWINGS

FIG. 11 is a block diagram illustrating an embodiment of the duplicator of this invention; and FIG. 12 is a block diagram showing another embodiment of this invention.

DESCRIPTION OF THE PREFERRED EMBODIMENTS

The present invention will hereinafter be described in detail with reference to FIGS. 2 to 11.

Figure 1:
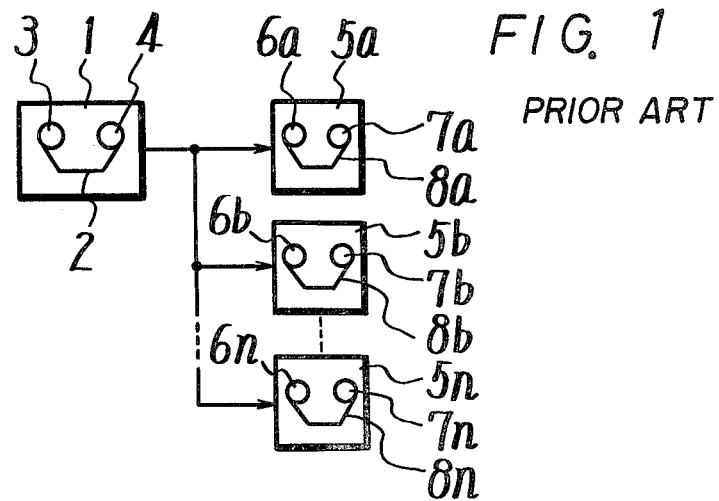
FIG. 1 is a schematic diagram showing a conventional duplicator.
Figure 2:
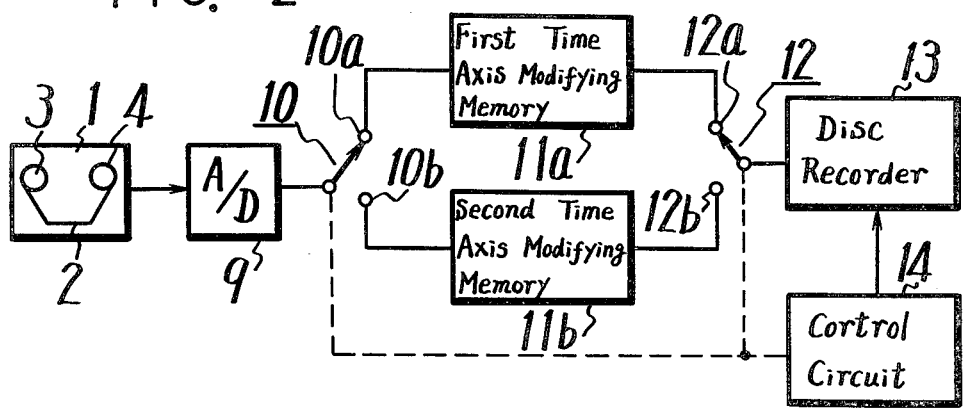
FIG. 2 is a block diagram showing the case of dubbing signals of a source tape in a magnetic disc by the duplicator of this invention.

In FIG. 2, signals recorded on a source tape 2 are reproduced therefrom by a source tape reproducing device 1 are applied to an A-D converter 9, thereafter being written in a first time axis modifying memory 11a via a first contact 10a of first switching means 10. The output from the A-D converter 9, that is, the output from the first time axis modifying memory 11a is read via first contact 12a of second switching means 12. At this moment, time axis compression takes place. The output thus read out is PCM recorded on a disc of a disc recorder 13.

During reading of the signals of the source tape stored in the first time axis modifying memory 11a, the contact piece of the first switching means 10 is switched by the action of a control circuit 14 to the side of a second contact 10b to write the output signals from the A-D converter 9 in a second time axis modifying memory 11b until reading of the signals from the first time axis modifying memory 11a terminates. Upon completion of reading of the signals from the first time axis modifying memory 11a, the contact piece of the second switching means 12 is switched by the control circuit 14 to the side of a second contact 12b to read therethrough the signals stored in the second time axis modifying memory 11b for PCM recording on the disc. At the same time, the contact piece of the first switching means 10 is changed over to the side of the first contact 10a to start writing of the output signals from the A-D converter 9 in the first time axis modifying memory 11a. Thereafter, the above operations are repeated, by which analog signals on the source tape are recorded on the disc after being converted into digital form.

A description will be given with regard to the fabrication of slave tapes by copying from a print mother tape used as a source tape; this applies to the preparation of a plurality of mother tapes by copying from a master tape used as a source tape and a plurality of print mother tapes by copying from the mother tape used as a source tape. The disc herein mentioned may be a magnetic or optical disc. The following embodiment will be described is connection with the case of employing magnetic discs.

Figure 3:
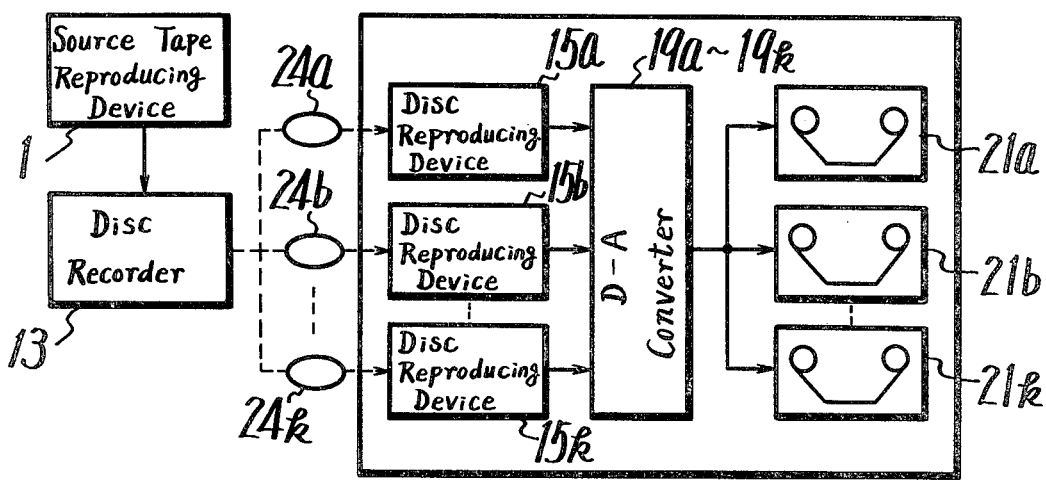
FIG. 3 is a block diagram illustrating the overall arrangement of the duplicator of this invention.

FIG. 3 shows the system layout of the duplicator of the present invention. The analog signals recorded on the source tape are reproduced by a source tape reproducing device 1 and recorder 13 on discs 24a, 24b, . . . 24k on the time axis compressed basis. The discs 24a, 24b, . . . 24k having thus recorded thereon the digital signals are respectively installed in disc reproducing devices 15a, 15b, . . . 15k to play back the digital signals, which are respectively provided via D-A converters 19a to 19k to a plurality of slave tape recording devices 21a, 21b, . . . 21k for recording on a plurality of tapes at the same time.

Figure 4:
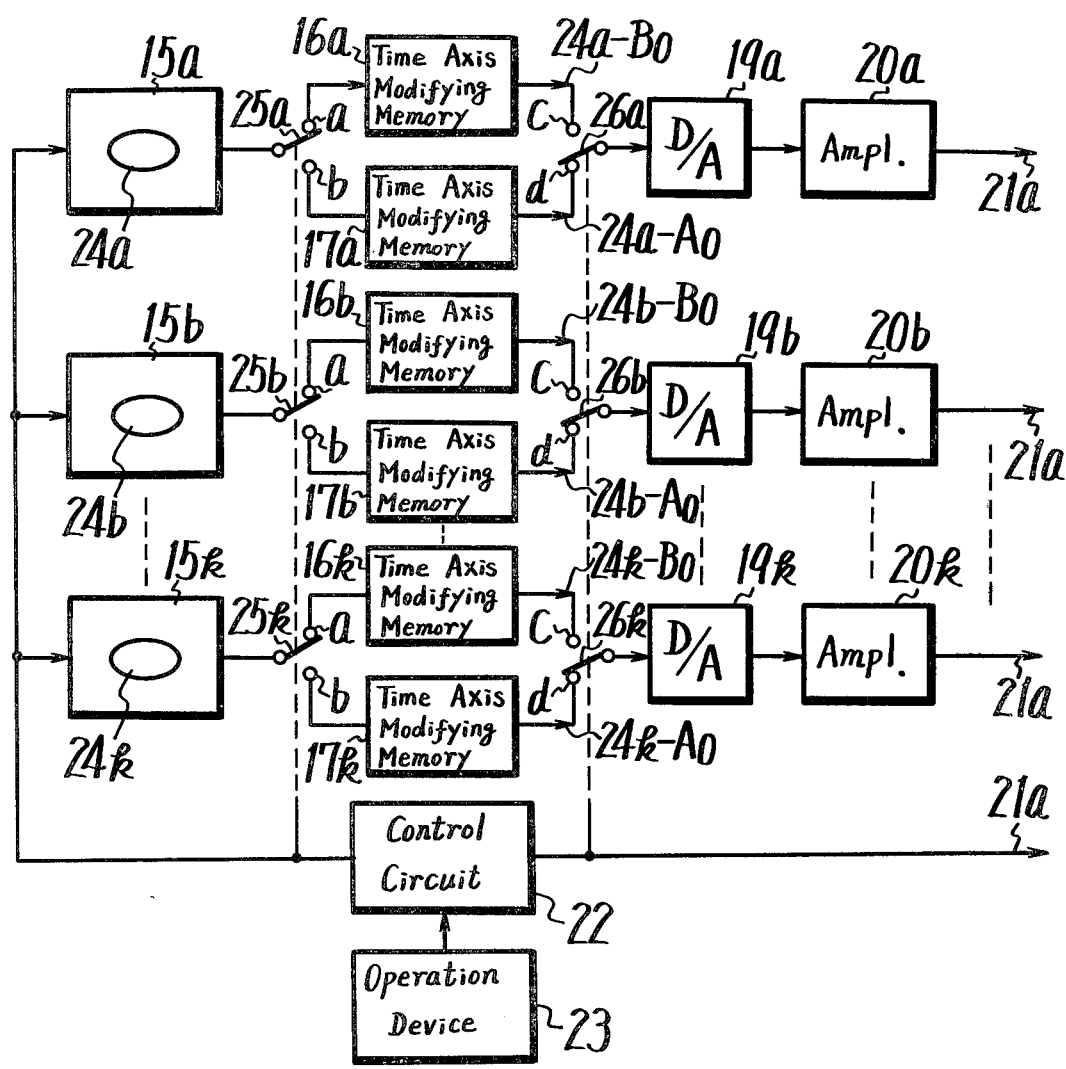
FIG. 4 is a block diagram showing the case of recording on slave tapes by the duplicator of this invention.
Figure 5:
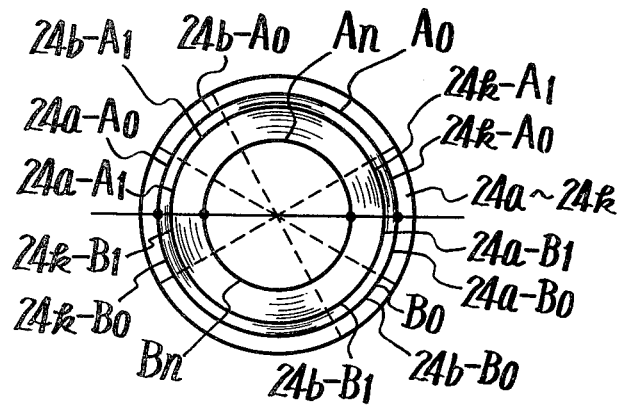
FIG. 5 is a plan view of a magnetic disc explanatory of the principles of this invention.

Referring next to FIG. 4, the abovesaid disc reproducing device will be described in detail in respect of the case of employing the magnetic disc. The magnetic discs 24a to 24k having recorded thereon PCM signals are respectively mounted on the magnetic disc reproducing devices 15a to 15k, as shown in FIG. 4, and the magnetic disc reproducing devices are operated in parallel. To perform this, both 180° portions $A_O$ and $B_O$ of, for example, the outermost groove of each magnetic disc 24 are respectively divided into k sections, and in a similar fashion, both 180° portions $A_I$ to $A_n$ and $B_I$ to $B_n$ of the inner grooves respectively divided into k sectors or sections as shown in FIG. 5. A signal $24a$-$A_O$ recorded in the first section of the 180° portion $A_O$ of the first magnetic disc 24a is written in the first time axis modifying memory 17a via a contact b of third switching means 25a; then, a signal $24b$-$A_O$ in the second section of the 180° portion $A_O$ of the second magnetic disc 24b is written in a contact b of third switching means 25b; likewise, a signal $24k$-$A_O$ of the kth section of one 180° portion $A_O$ of the kth magnetic disc 24k is written in a time axis modifying memory 17k via a contact b of third switching means 25k. In FIG. 5, signals $24a$-$A_O$ to $24k$-$A_O$ and signals $24a$-$B_O$ to $24k$-$B_O$ are conventionally written on a single disc, but in fact the signals read out from the discs 24a . . . 24k are written on separate discs respectively. Following this, a command is applied from an operation device 23 to a control circuit 22 to connect contact pieces of all the third switching means 25a to 25k to contacts a thereof and change over contact pieces of fourth switching means 26a to 26k from contacts thereof c to d, as shown. As a consequence, signals $24a$-$B_O$ to $24k$-$B_O$ are successively provided to time axis modifying memories 16a to 16k from the first to kth divided sections of the other 180° portions of the outermost grooves of the first to kth magnetic discs 24a to 24k, whereas the digital signals previously applied to the time axis modifying memories 17a to 17b, as described above, are successively read therefrom in the order $(24a$-$A_O)$-$(24b$-$A_O)$- . . . $(24k$-$A_O)$ via the fourth switching means 26a to 26k into the D-A converters 19a to 19k and supplied via amplifiers 20a to 20k to the slave tape recording device 21a, wherein they are recorded on the slave tape at a speed, for example, 32 times higher than the standard tape speed. Of course, the slave tape recording devices 21a is placed under the control of the control circuit 22.

Figure 7:
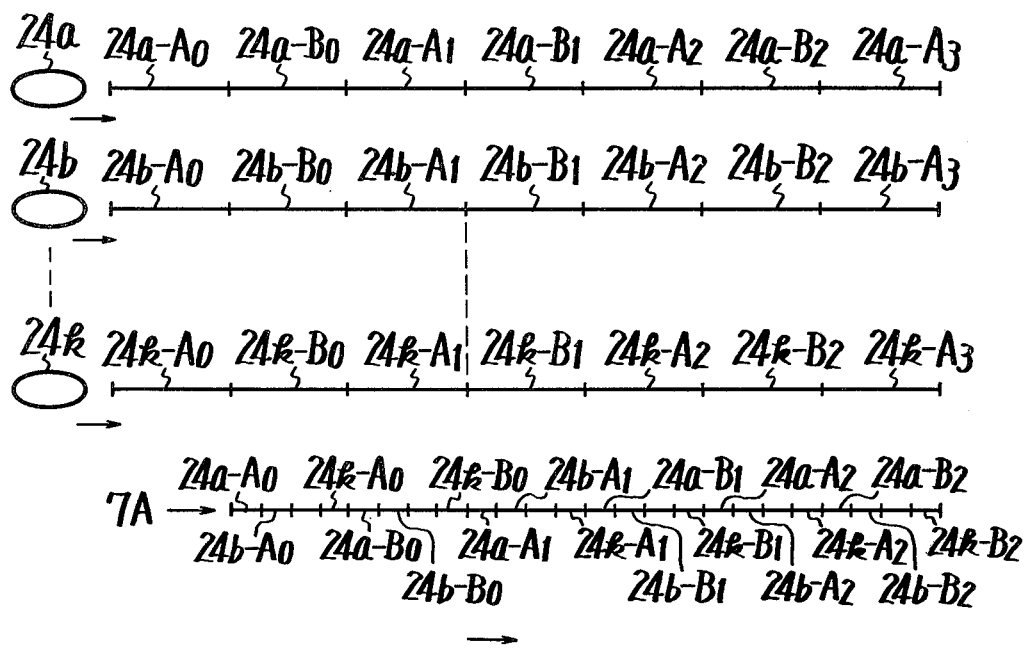
FIG. 7 is a timing chart explanatory of the operation of this invention.

FIG. 7 shows, by way of example, timing charts of the digital data respectively reproduced from the magnetic discs 24a to 24k in FIGS. 4 and 5. As shown in FIG. 7, in a first time slot, the signals $24a$-$A_O$ to $24k$-$A_O$ recorded in the first to kth sections of the 180° portions $A_O$ of the outermost grooves of the first to kth magnetic discs 24a to 24k are reproduced; in a second time slot, the signals $24a$-$B_O$ to $24k$-$B_O$ recorded in the first to kth sections of the other 180° portions $B_O$ of the outermost grooves are reproduced; in a third time slot, signals $24a$-$A_I$ to $24k$-$A_I$ recorded in the first to kth sections of 180° portions $A_I$ of the grooves second from the outermost ones are reproduced; . . . . In this way, the signals recorded on the magnetic discs are successively reproduced and subjected to time axis compression to be provided in such an order as indicated by 7A in FIG. 7.

Figure 6A:
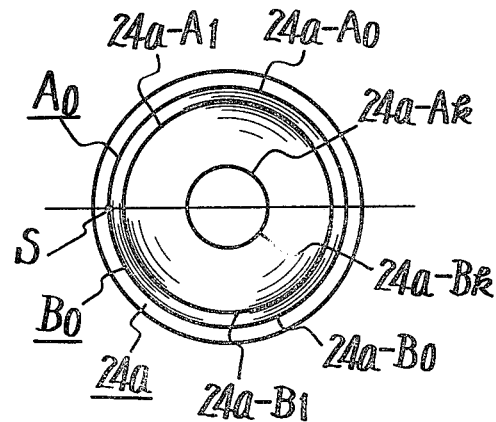
FIGS. 6A, 6B, ... 6K are respectively plan views of other magnetic discs used in the invention.
Figure 6B:
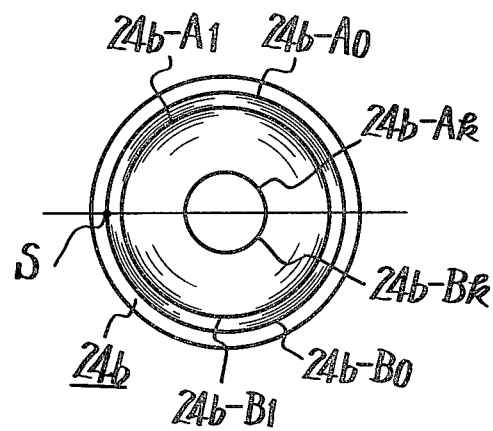
Figure 6K:
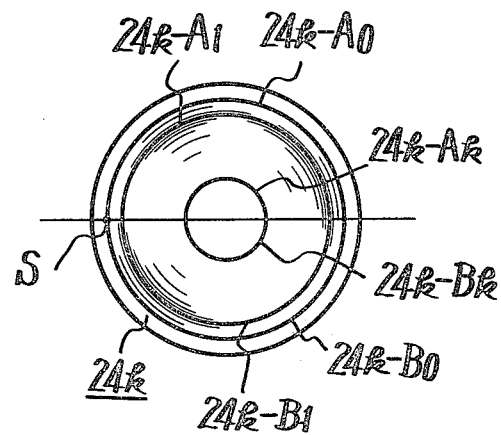

In the disc shown in FIG. 5, each of the 180° tracks $A_O$ to $A_n$ and $B_O$ to $B_n$ on, for example, one disc 24a is divided into k sectors. However, it is also possible that, as shown in FIGS. 6A . . . 6k, each of the first to k'th disc 24a to 24k is divided into two sectors and the tracks of the discs 24a to 24k are recorded thereon as the sectors of $24a$-$A_O$ to $24a$-$A_k$, $24a$-$B_O$ to $24a$-$B_k$; $24b$-$A_O$ to $24b$-$A_k$, $24b$-$B_O$ to $24b$-$B_k$; . . . $24k$-$A_O$ to $24k$-$A_k$, $24k$-$B_O$ to $24k$-$B_k$, respectively. In this case, if reading out is initiated at a start position S of the outer most track of each of the disc 24a to 24k, as shown in FIG. 7, the signals $24a$-$A_O$, $24b$-$A_O$, . . . $24k$-$A_O$ can be sequentially written on the axis modifying memories 17a to 17k after being time axis compressed. When such signals are read out, the compressed signals $24a$-$A_O$ to $24k$-$A_O$ shown in FIG. 7 by 7A are obtained. Similarly, the signals $24a$-$B_O$, $24b$-$B_O$, . . . $24k$-$B_O$ of the next half sectors are read out in sequence. Thereafter, when the heads return to the start position S, the heads are shifted to the next inner tracks $24a$-$A_I$, $24b$-$A_I$, . . . $24k$-$A_I$ to read out the signals therefrom sequentially. The above operation will be repeated.

In the above, the reproduced outputs from the first to kth magnetic discs are recorded in the same phase but may also be phase shifted sequentially.

The highest signal transfer rate from the magnetic disc which is usually employed at present is 9.6 M bits/s, and in the case of recording signals by the PCM recording system, a transfer rate of 504K bits/s is needed for each channel if the recording frequency and the number of quantizing bits used are selected 15 KHz and 14 bits, respectively. On top of that, if dubbing is effected at a speed 32 times as high as the standard tape speed, then the transfer rate required is as high as 16.128 M bits/s, which is far higher than the abovesaid transfer rate of 9.6 M bits/s. However, by driving more than one magnetic disc reproducing devices in parallel and transferring the respective data therefrom alternately on the time axis compressed basis as described above, the data transfer rate can essentially be raised. It is evident that if the number of magnetic disc reproducing device to be driven in parallel is taken as n, the overall transfer rate is increased n times as high as the transfer rate of one disc reproducing device.

Figure 9:
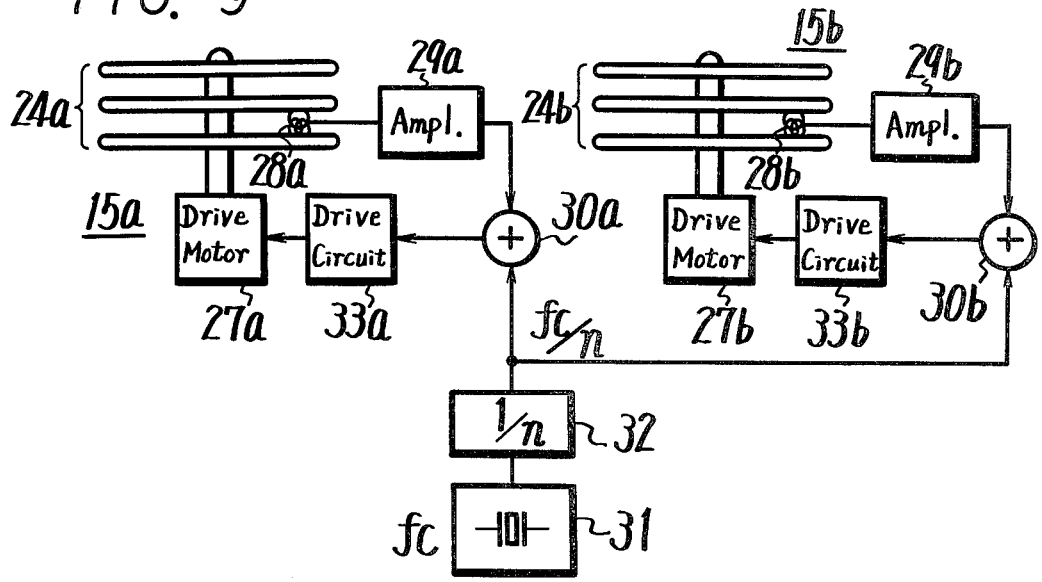
FIG. 9 is a block diagram illustrating a motor control arrangement in this invention.

In the present invention, since the disc reproducing devices are driven in parallel, the respective data therefrom gradually becomes displaced in phase unless the discs are driven exactly in synchronization with one another. To avoid this, the present invention utilizes an arrangement such, for example, as shown in FIG. 9. In FIG. 9, signals are prerecorded in control tracks formed on the undersides of, for example, central ones of triads of magnetic discs 24a and 24b which are mounted on turntables respectively driven by drive motors 27a and 27b of the magnetic disc reproducing devices 15a and 15b. The signals thus prerecorded in the control tracks are respectively picked up by magnetic heads 28a and 28b and amplified by amplifiers 29a and 29b, thereafter being applied to phase comparators 30a and 30b. At the same time, a signal of a frequency $f_c$ is generated from a reference signal generator 31 and frequency divided by a frequency divider 32 down to $f_c/n$, thereafter being applied to the phase comparators 30a and 30b, respectively. In the phase comparators 30a and 30b, the signals reproduced from the control tracks are respectively compared with the signal of the frequency $f_c/n$, and the compared outputs are provided via drive circuits 33a and 33b to the drive motors 27a and 27b to control their revolving speed, thus preventing loss of synchronism of the magnetic discs.

Figure 8:
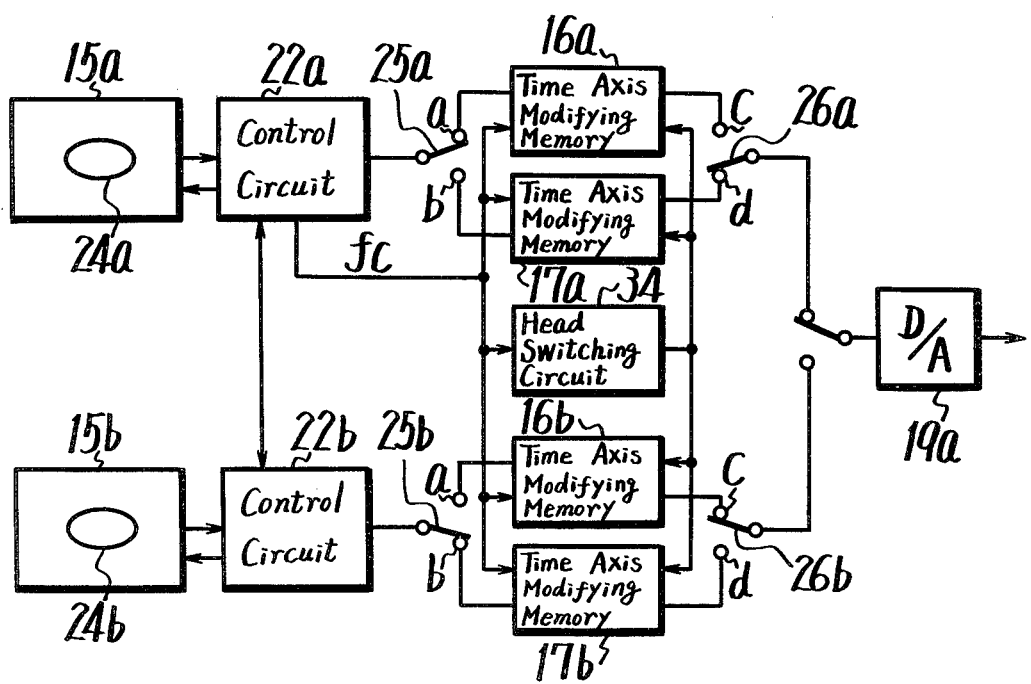
FIG. 8 is a block diagram illustrating a time axis modifying memory control system in this invention.

In this case, as shown in FIG. 8, the plurality of time axis modifying memories 16a, 16b, 17a and 17b are controlled by the signal of the frequency $f_c$ yielded from the abovesaid reference signal generator 31, and the frequency $f_c$ is multiplied by a multiplier 34 by an integral multiple of the number of magnetic disc reproducing devices which are driven in parallel. In the case of FIG. 8, since the number of magnetic disc reproducing devices used is two, the frequency $f_c$ is increased to $2f_c$; if n magnetic disc reproducing devices are employed, then frequency $f_c$ is multiplied to $nf_c$, by which the read rate of the time axis modifying memories 16a, 16b, 17a and 17b is controlled. In FIG. 8, parts corresponding to those in FIG. 3 are identified by the same reference numerals, and no detailed description will be repeated.

Figure 10:
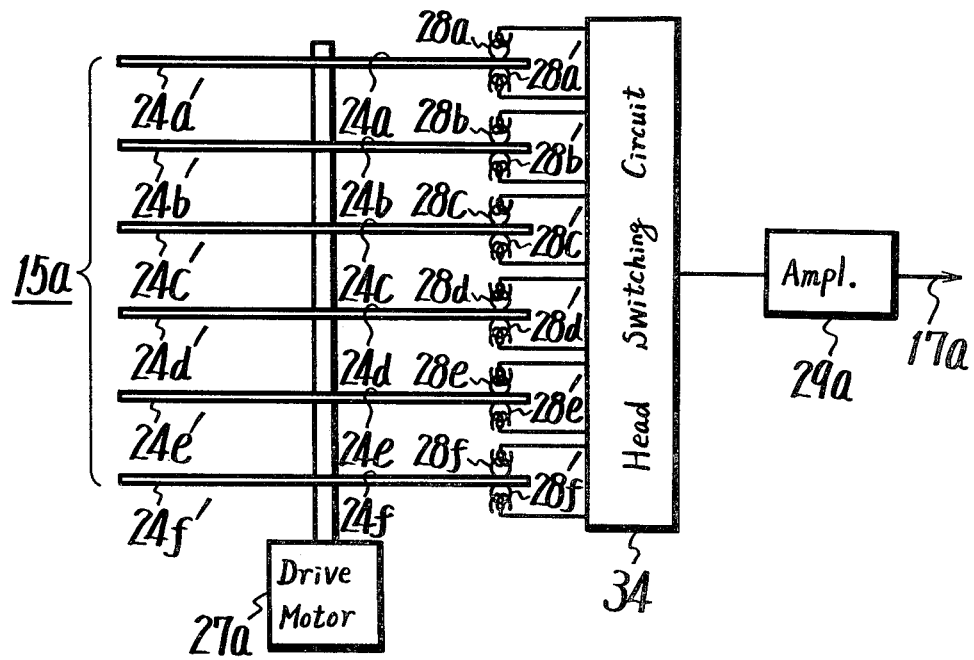
FIG. 10 is explanatory of recording signals on slave tapes by the conventional duplicator.

Another embodiment of the present invention will herebelow be described with reference to FIGS. 10 to 12. In this embodiment, a magnetic head group for one digital disc is divided into two systems and digital signals therefrom are transferred alternately. A conventional arrangement of this type is such as depicted in FIG. 10, in which magnetic discs 24a to 24f and 24a' to 24f' are mounted on a plurality of disc supports disposed on the spindle of the motor 27a of the magnetic disc reproducing device 15a, and signals recorded on the magnetic discs 24a to 24f and 24a' to 24f' are reproduced by an upper group of magnetic heads 28a to 28f and a lower group of magnetic heads 28a' to 28f' respectively. The reproduced outputs by the magnetic heads are each applied to a head switching circuit 34 formed by a diode matrix and then provided via an amplifier 29 to the time axis modifying memory 17a. With such arrangement, however, a single output is produced by the head switching circuit 34 is one, and in the magnetic disc device now used in computers, the signal transfer rate is insufficient.

In the present invention, the outputs from the magnetic discs mounted on the spindle of the magnetic disc reproducing device 15a are divided, for example, into two systems, in which the outputs are respectively processed, as shown in FIG. 11. Namely, the outputs from the two groups of magnetic heads 28a to 28c' and 28d to 28f' are respectively applied to head switching circuits 34a and 34b, the outputs from which are provided to the slave tape recording device 21a via the route [first switching means 25a→ time axis modifying memory 17a or 17b→ second switching means 26a→ D-A converter 19a] and via the route [first switching means 25b→ time axis modifying memory 17c or 17d→ second switching means 26b→ D-A converter 19b], respectively, thus recording analog signals of right and left channels on the slave tape.

FIG. 12 illustrates an arrangement for recording the left channel signal alone. The digital outputs taken out in serial by the head switching circuits 34a and 34b are written in the time axis modifying memories 17a and 17b. By changing over the first and second switching means 25a, 25a' and 26a, 26a', contact pieces of the first switching means 25a and 25a' are switched to the sides of the time axis modifying memories 17a and 17a' to read therefrom the signals stored therein, while at the same time the outputs from the head switching circuits 34a and 34b are written in the time axis modifying memories 17b and 17b' respectively. The output read from the time axis modifying memory is provided via third switching means 26 and the D-A converter 19a to the slave tape recording device 21a, wherein it is recorded as a left channel signal in analog form on the slave tape.

In the above embodiment of the present invention, since the output from the magnetic disc reproducing device is divided into two systems as described above, the transfer rate from the magnetic disc reproducing device is essentially doubled; if the output is divided into n systems, then the transfer rate is increased n times.

With the present invention described in the foregoing, slave tapes need not be driven at high speed and, by changing the read-write rate of the time axis modifying memory circuit electrically slave tapes can be obtained very easily in a time equal to 1/32 of the ordinary tape translation speed; consequently, the magnetic disc corresponding to the print mother tape is less damaged and the transfer rate can be raised essentially. On top of that, even if a plurality of magnetic disc reproducing devices are driven in parallel, there is no fear that they will get out of step. Thus, the present invention offers solutions to the problems of the prior art referred to at the beginning of this specification.

It will be apparent that many modifications and variations may be effected without departing from the scope of the novel concepts of this invention.

What is claimed is:

1. A duplicator for duplicating an analog signal, comprising:

at least first and second discs;

said first disc having recorded thereon a first digital representation of a first pair of said analog signal;

said second disc having recorded thereon a second digital representation of a second part of said analog signal contiguous to said first part;

means for simultaneously reproducing said first and second digital representations at a first rate;

first and second memory means effective respectively for storing the reproduced first and second digital representations;

means for sequentially reading out the stored first and second digital representations from said first and second memory means at a second rate substantially higher than said first rate; and means for converting the first and second digital representations into a reconstructed analog signal suitable for recording.

2. A duplicator according to claim 1, further comprising third and fourth memory means and switching means, said switching means being effective to enable simultaneous storing of digital representations at said first rate in said third and fourth memory means while digital representations are sequentially read out of said first and second memory means at said second rate and vice versa.

3. A duplicator according to claim 1, wherein said means for simultaneously reproducing includes means for driving said digital discs in parallel and synchronously.

4. Apparatus for duplicating a recorded analog signal at a duplicating speed substantially exceeding a recording speed at which the analog signal was recorded, comprising:

a plurality of digital disc recording devices;

means for reproducing said analog signal;

means for digitizing sid analog signal to produce a digital signal;

means for cyclically applying succeeding portions of said digital signal to succeeding ones of said plurality of digital disc recording devices;

a plurality of synchronized digital disc reproducing devices each effective to reproduce digital data from one digital disc recorded by said digital disc recording device;

a plurality of pairs of time axis modifying memories, each pair of memories being alternately effective to write therein one of said portions of digital data from a predetermined one of said digital disc reproducing devices at a first data rate and to read out said portion of digital data at a second data rate higher than said first data rate;

means for controlling reading out of said memories so that succeeding portions of said digital signal are sequentially reproduced to reconstruct said digital signal at said second data rate; and means for converting the reconstructed digital signal to at least one analog signal suitable for recording on at least one analog recording device.

5. A slave tape recording method for recording an analog signal comprising the steps of:

converting said analog signal into a digital signal;

recording a first portion of said digital signal on a first disc recorder;

recording a second portion of said digital signal contiguous to said first portion on a second disc recorder;

simultaneously reproducing the first and second digital signals at a first rate;

separately storing the reproduced first and second digital signals;

sequentially reading out the stored first and second digital signals at a second rate higher than said first rate;

combining the sequential first and second digital signals;

converting the combined digital signals into an analog replica of said analog signal; and recording said analog replica.

* * * * *